Dec. 1, 1964 T. R. HARPLEY 3,159,766
BALLAST APPARATUS AND SYSTEM FOR DIMMING ARC DISCHARGE LAMPS
Filed Jan. 3, 1961 2 Sheets-Sheet 1
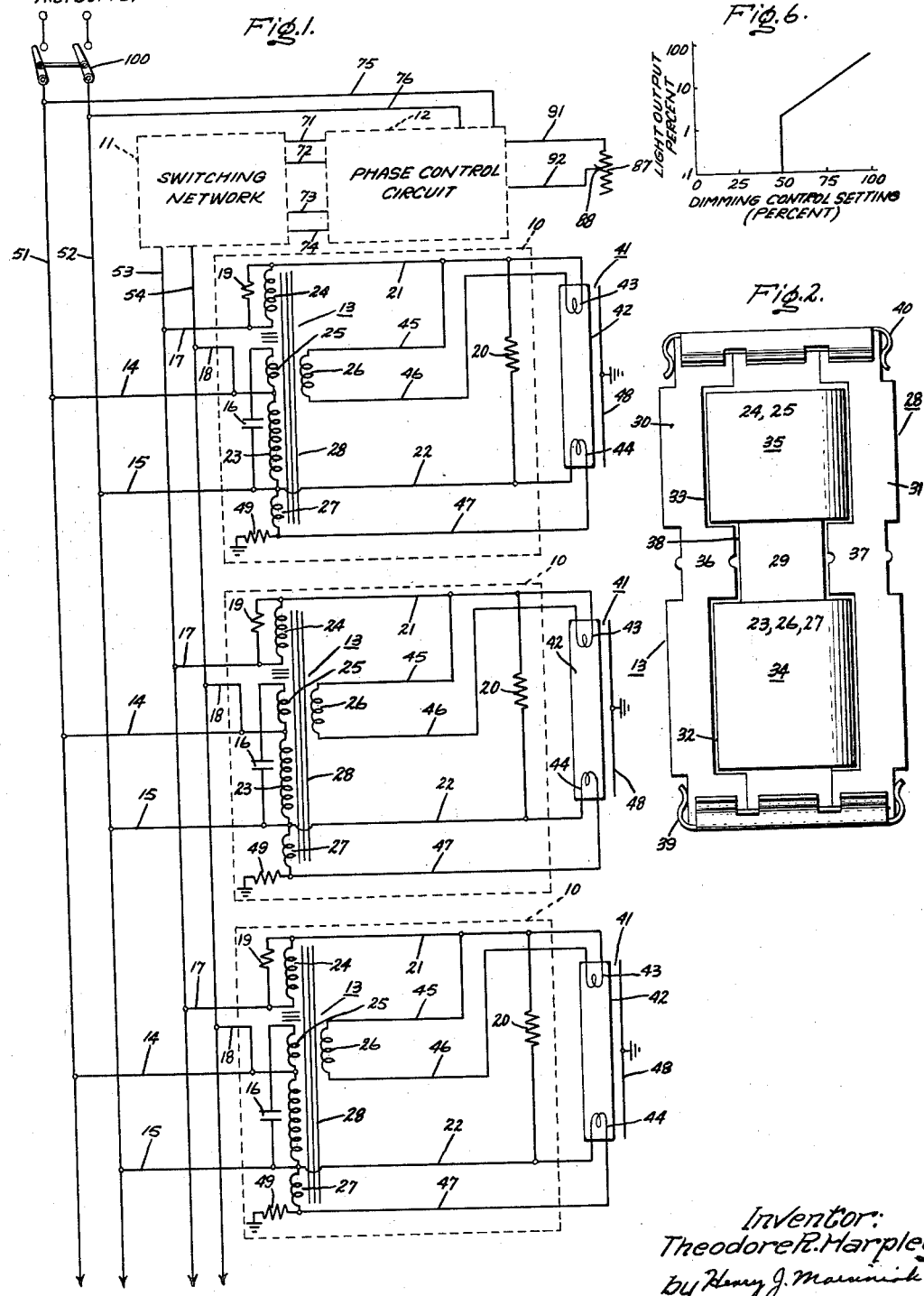
Inventor:
Theodore R. Harpley,
by Henry J. Marsinick
Attorney.

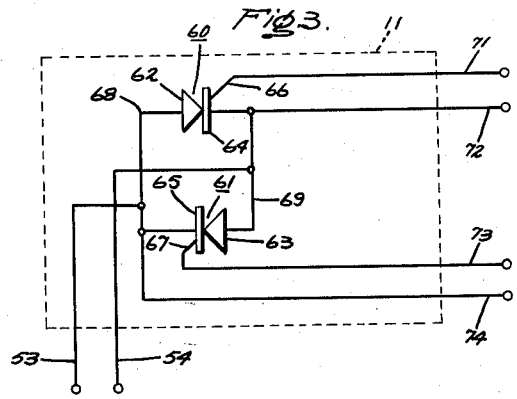
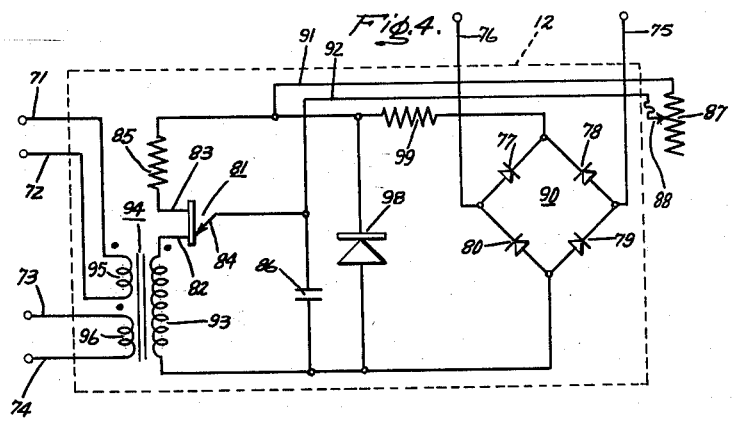
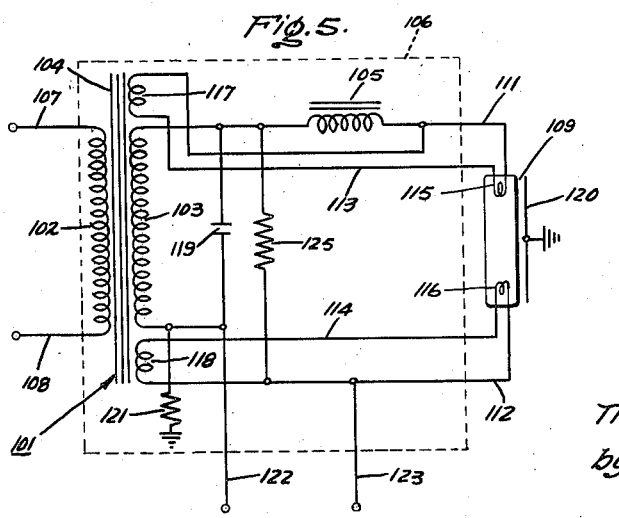

United States Patent Office 3,159,766
Patented Dec. 1, 1964

3,159,766
BALLAST APPARATUS AND SYSTEM FOR DIMMING ARC DISCHARGE LAMPS
Theodore R. Harpley, Danville, Ill., assignor to General Electric Company, a corporation of New York
Filed Jan. 3, 1961, Ser. No. 80,167
2 Claims. (Cl. 315—195)

This invention relates to a ballast apparatus and system for dimming gaseous discharge lamps and more particularly to a ballast apparatus and system wherein dimming is achieved by regulating the interval of current conduction during each half cycle of the alternating current supply.

Control of the interval of current conduction in each half cycle may be achieved by utilizing a switching network employing a pair of inversely connected electronic valves, such as controlled rectifiers or thyratrons, which are fired at a predetermined point during each half cycle of the alternating current supply. The phase angle at which the electronic valves are fired determines the interval of current conduction. Generally, it is necessary to provide a current or voltage signal to fire the electronic valve and the control circuit is operated symmetrically with respect to each phase of the input alternating current voltage so that an equal loading of each phase of the main supply results.

A phase control circuit operating a switching network may be readily adapted to control the luminous intensity of a large group of lamps without employing motor driven or mechanically moving parts. In circuits employing solid state switching elements, it has been possible to provide control systems which are only a small fraction of the size and weight of conventional systems utilizing mechanical controls performing comparable functions. Although the advantages accruing from the use of phase control circuits in dimming applications have been recognized, these advantages have not generally been realized in practice. One drawback to the effective utilization of phase control circuits in the dimming of fluorescent lamps has been the difficulty encountered in obtaining satisfactory dimming performance. As an example, in an application of phase control circuit to a conventional fluorescent lamp system, it was found that the energy delivered to the fluorescent lamp changed radically with a shift in the conduction angle of the applied voltage in the point of the dimming range where the light output is a small percentage of the maximum and a sharp step in light output occurred. In many applications a sharp step in light output is undesirable. Therefore, there is a need for a ballast apparatus that can be used in a fluorescent lamp system for dimming a plurality of lamps utilizing a switching network employing solid state switching elements whereby fluorescent lamps can be progressively dimmed over a wide range of luminous intensity levels without any sharp step in light output.

Accordingly, it is an object of the present invention to provide a ballast apparatus and system wherein arc discharge lamps such as fluorescent lamps can be effectively dimmed by controlling the interval of current conduction to the lamps during each half cycle of the alternating current supply.

Another object of the present invention is to provide an improved ballast apparatus for use in conjunction with a pair of solid state switching elements which are alternately fired to control the interval of current supplied to the lamps.

In accordance with the invention, I have provided a ballast apparatus for dimming and operating at least one gaseous discharge lamp at various light intensity levels from an alternating current source and a switching network by controlling the interval of current conduction to said lamps during each half cycle. The ballast apparatus includes a transformer having a primary winding for connection across the alternating current source and a secondary winding, a ballast means, a pair of output leads for connection across the lamps, a pair of switching terminals for connection in circuit with the switching network, and circuit means connecting the secondary winding, the ballast means and the output leads across the switching terminals. I have found that it was possible to prevent a sharp step in light output by employing a resistor in shunt with the lamp and the ballast means, which may be a separate reactor or included in the transformer by providing a secondary winding with a high leakage reactance.

The subject matter which I regard as my invention is set forth in the appended claims. The invention itself, however, together with further objects and advantages thereof may be understood by referring to the following description taken in connection with the accompanying drawings in which:

FIG. 1 is a schematic circuit diagram of a fluorescent lamp dimming system in which the present invention is embodied;

FIG. 2 shows a diagrammatic plan view of the core and coil assembly used in the illustrative embodiment of the invention;

FIG. 3 is a schematic circuit diagram of the switching network shown as a dashed rectangle in FIG. 1;

FIG. 4 is a schematic circuit diagram of the phase control circuit shown as a dashed rectangle in FIG. 1;

FIG. 5 shows another illustrative embodiment of a ballast apparatus in accordance with the invention; and, FIG. 6 shows a plot of percent light output versus percent setting of the dimming control for a comparable circuit of the prior art.

Referring to FIG. 1, it will be seen that a ballast apparatus, a switching network and a phase control circuit are shown enclosed in dashed rectangles 10, 11, 12, respectively. Since the ballast circuit enclosed in dashed rectangles 10 are identical, the corresponding parts and connections of each of the several ballast circuits are identified by the same reference numerals. It will be noted that the internal circuit connections and components for the switching network enclosed by dashed rectangle 11 and the phase control circuit enclosed by dashed rectangle 12 are not illustrated in FIG. 1. Only the external circuit connections are illustrated. The internal connections and components are shown schematically in FIGS. 3 and 4.

As shown in the dashed rectangles of FIG. 1, the ballast circuits include a high reactance ballast transformer 13, input leads 14, 15, a power factor capacitor 16, switching terminal leads 17, 18, resistors 19, 20 and output leads 21, 22. The ballast transformer 13 is comprised of a primary winding 23 connected across input leads 14, 15, a high leakage reactance secondary 24, a second secondary 25, two cathode heating windings 26 and 27, and a magnetic core 28. In accordance with this invention, the resistor 19 is connected in shunt with the high leakage reactance secondary 24 and resistor 20 is connected across the output leads 21, 22. Such an arrangement resulted in an improved dimming performance when the ballast circuits were operated in the system shown in FIG. 1.

Referring now to FIG. 2, it will be noted that the ballast transformer 13 employed in the illustrative embodiment of the invention utilizes a conventional core and coil assembly. The magnetic core 28 is comprised of a laminated central winding leg 29 and oppositely disposed E-shaped lamination stacks 30, 31 which form a closed magnetic circuit with the central winding leg 29.

The legs of the E-shaped lamination stacks 30, 31 define a pair of coil receiving windows 32, 33 wherein coils 34, 35 are respectively mounted on the central winding leg 29. Coil 34 includes primary winding 23 and the two cathode heating windings 26, 27, and coil 35 includes the high leakage reactance secondary winding 24 and the second secondary 25. The middle legs of the E-shaped lamination stacks 30, 31 form magnetic shunts 36, 37, the ends of which are spaced from the central winding leg 29 by an air gap 38. Further, it will be seen that the E-shaped lamination stacks 30, 31 and central winding leg 29 are held in assembled relation by suitable clamping members 39, 40.

Cathode heating windings 26, 27 are tightly coupled with the primary winding 23 in order that the supply of cathode heating current may be maintained at a constant value. The loose coupling between the primary winding 23 and the high leakage reactance secondary winding 24 is required in order to obtain the necessary leakage reactance to limit the current supplied to an arc discharge lamp which has a negative resistance characteristic.

The second secondary winding 25 is connected in series circuit relationship with the power factor capacitor 16 across the primary winding 23. The principal purpose of the second secondary winding 25 is to increase the voltage across the power factor capacitor 16 above the source voltage applied across the primary winding 23. By increasing this voltage it is possible to reduce the size and cost of the capacitor required to correct the over-all power factor of the ballast circuit. It will be appreciated that capacitor 16 draws a leading current from the primary winding 23 which thereby offsets the lagging magnetizing current. Although the ballast circuits used in the illustrative embodiments of the invention shown in both FIGS. 1 and 5, it will be understood that these circuits can be readily converted to a low power factor arrangement.

In the dimming system shown in FIG. 1, preferably rapid start fluorescent lamps 41 may be used. Each of the lamps 41 is comprised of an elongated tubular cylindrical envelope 42 having sealed into the ends thereof filamentary cathodes 43, 44. It will be seen that cathode heating windings 26, 27 are connected in circuit with the filamentary cathodes 43, 44 by conductors 45, 46 and 47, 22. Further, a grounded conducting plate 48 may be located in proximity to lamp 41 and serves in conjunction with grounded resistor 49 as a starting aid to apply a starting potential to one of the cathodes 43, 44.

Input leads 14, 15 are intended to connect primary winding 23 across supply lines 51, 52 which are connected to a power source (not shown) such as a 120 volt, 60 cycle commercial power supply. Supply line 51 is connected to the high side of the power supply while the other supply line 52 is connected to the low side. By virtue of the grounded resistor 49, it will be appreciated that the end of the winding 27 to which it is connected will be the same voltage potential as conductive plate 48.

Each of the ballast circuits as shown in FIG. 1 are connected externally by means of terminal leads 17, 18 to switching network lines 53, 54. As will be hereinafter more fully described, the single switching network used in the illustrative embodiment of the invention was designed to handle the current required to operate fifty 40 watt rapid start lamps. Although only three ballast circuits and lamp 41 are shown connected to the supply lines 51, 52 and the switching network lines 53, 54, it will be understood that additional ballast circuits and lamps are connected in the system in the same manner.

In the illustrative embodiment of the invention shown in FIG. 1, the number of lamps dimmed depends primarily upon the current carrying capacity of the switching means employed in the switching network. Although only a single lamp 41 is shown operated by each ballast circuit, it will be appreciated that two or more lamps can be operated if desired by modifying the circuits to provide the additional starting and operating voltages. Where the voltages in the ballast circuits are increased to provide increased open circuit voltages required for multiple lamp operation, the switching elements must be capable of handling these voltages.

Referring now to FIG. 3, the switching network used in the illustrative emodiment of the invention utilizes two silicon controlled rectifiers 60, 61 as a switching means. Silicon controlled rectifiers are suitable switching elements since they are asymmetrical conductors which can be readily switched on and off during each half cycle of the alternating current supply. The operating characteristics of a silicon controlled rectifier are such that it conducts in a forward direction with a forward characteristic very similar to that of an ordinary rectifier when a gate signal is applied. Thereafter, it continues conduction even after the gate signal is removed, provided the minimum holding current flows through the controlled rectifier.

Controlled rectifiers 60, 61 are PNPN semiconductors each having three terminals, an anode 62, 63, a cathode 64, 65 and a gate 66, 67, respectively. It will be understood that the controlled rectifiers 60, 61 can be switched into a high conduction state at an anode-to-cathode voltage less than the breakover voltage by supplying a low level gate-to-cathode current. This characteristic permits the controlled rectifiers to be used to control a substantially large current flow by a low power signal supplied to the gate. The switching network lines 53, 54, are connected to parallel branches 68, 69 in which the controlled rectifiers 60, 61 are inversely connected. In such an arrangement one of the controlled rectifiers 60 or 61 will conduct during the positive half cycle of the alternating current supply and the other will conduct during the negative half of the cycle. The controlled rectifier which has the positive anode voltage during the half cycle is the one that is triggered into a conducting state when a firing pulse is supplied to the gate. Thus, when the anode voltages of one of the controlled rectifiers 60, 61 is negative, the firing pulse will not trigger the controlled rectifier. Conductors 71, 72, 73, 74 connected across the gates 66, 67 and cathodes 64, 65 of controlled rectifiers 60, 61, respectively, are provided to carry the control signal or firing pulses supplied by the phase control circuit.

In order to control the point during each half cycle at which the controlled rectifiers 60, 61 are fired, a phase control circuit, as shown in FIG. 4, is used in the illustrative embodiment of the invention. It will be seen that the phase control circuit is energized from the alternating current supply lines 51, 52 by leads 75, 76 through a full wave bridge rectifier 90 having diodes 77, 78, 79, 80. The phase control circuit includes a unijunction transistor 81 having a base-one electrode 82, a base-two electrode 83, and an emitter electrode 84.

Between base-one electrode 82 and base-two electrode 83, the unijunction transistor 81 has the characteristics of an ordinary resistance. A resistor 85 is connected in circuit with the base-two electrode 83 to limit the current thereto. A capacitor 86 is connected across the emitter electrode 84 and base-one electrode 82 of the unijunction transistor 81. The capacitor 86 is charged through a variable resistor 87 having an adjustable tap 88. As shown in FIGS. 1 and 4, the variable resistor 87, although a component of the phase control circuit, is illustrated as being connected outside thereof by lines 91, 92. Since the variable resistor 87 serves as the dimming control for the entire fluorescent lamp system, the variable resistor 87 may be located at a remote control station depending upon the specific application.

The phase control circuit shown in FIG. 4 is essentially a relaxation oscillator. If the voltage across the capacitor 86 is less than the emitter peak point voltage of the unijunction transistor 81, the emitter 84 is reverse biased. As long as the emitter 84 is reverse biased, the capacitor 86 is charged through resistor 87. When the voltage on the capacitor 86 reaches the emitter peak point voltage, the unijunction transistor 81 will fire. When the unijunction transistor 81 is fired, the resistance between the emitter electrode 84 and base-one electrode 82 is very low, and therefore capacitor 86 is discharged through the base-one electrode 82. The discharge current produces a positive pulse across a primary winding 93 of pulse transformer 94. Firing pulses are thereby induced in secondary windings 95, 96 which are applied to controlled rectifiers 60, 61 by conductors 71, 72, 73, 74. As the capacitor is discharged, the emitter voltage drops to a point where the unijunction transistor 81 is turned off, and capacitor 86 is charged again to repeat the cycle.

In order to limit the maximum interbase voltage of the unijunction transistor 81, a zener diode 98 and a resistor 99 are connected in circuit with the bridge 90. Thus, a clipped pulsating voltage is applied across unijunction transistor 81, the interbase voltage being essentially constant where the circuit is functioning to control the phase angle of the controlled rectifiers 60, 61.

The zener diode 98 used in the exemplification of the invention is a semiconductor diode, preferably a silicon diode, having a predetermined reverse breakdown voltage. For voltages below the breakdown value, the diode 98 acts as a rectifier and only a negligibly small leakage current can flow in the reverse direction. However, when the reverse voltage exceeds the breakdown value, the diode 98 presents a very low resistance and permits current to flow freely in the reverse direction with no substantial increase in voltage.

The pulse transformer 94 provides A.C. coupling and D.C. isolation between the phase control circuit and the switching network. The secondary windings 95, 96 are in a one-to-one turns ratio with the primary winding 93. Identical positive pulses are induced in the secondary windings 95, 96 which will trigger the controlled rectifier 60 and 61 which has positive anode voltage during the half cycle.

In FIG. 5 of the drawings, I have illustrated another embodiment of the invention wherein a transformer 101 having a primary winding 102 and an isolated secondary 103 inductively coupled therewith on a magnetic core 104 and a current limiting reactor 105 are employed in a ballast circuit shown enclosed in the dashed rectangle 106. Input leads 107, 108 are provided for connection across an alternating current supply. A fluorescent lamp 109 is connected to the output leads 111, 112 and filament leads 113, 114, which provide lamp cathodes 115, 116 with heating current induced in cathode heating windings 117, 118. To correct for power factor a capacitor 119 may be connected across the primary winding 103. A grounded conductive plate 120 positioned in proximity to lamp 109 and a grounded resistor 121 connected to one end of the secondary winding 103 may be used to aid in starting.

The ballast circuit shown in FIG. 5 is connected in the dimming system of FIG. 1 in the same manner as are the ballast circuits shown connected therein. The input leads 107, 108 are for connection to the supply lines 51, 52. Switching terminal leads 122, 123 are provided for connection to switching network lines 53, 54.

In accordance with the invention I have discovered that a resistor 125 connected across the reactor 105 and the lamp 109 will prevent a sharp step-up in light output which occurred approximately in the middle of the dimming range. It will be appreciated that the switching network and phase control circuit regulate the interval of the current conduction in the ballast circuit of FIG. 5 in the same manner as will hereinafter be more fully described in connection with the ballast circuits of FIG. 1.

Having reference to the schematic circuits shown in FIGS. 1, 3 and 4, the operation of the circuits will now be more fully described. Operation is initiated by closing line switch 100 and thereby energizing the ballast and phase control circuits. The bridge 90 converts the alternating current supplied to the phase control circuit to a full wave rectified voltage that is clipped by the zener diode 90 and then applied to unijunction transistor 98.

At the start of the first rectified alternating current wave, capacitor 86 begins charging. The setting of the variable resistor 87 determines the rate at which capacitor 86 is charged to the peak emitter voltage or, in other words, the point at which unijunction transistor 81 is fired during each half cycle before the polarity of the line voltage reverses. Until the unijunction transistor 81 is fired at some point in the half cycle, the controlled rectifiers 60, 61 are in a blocking state and no current flows in the secondary winding 24, even though the primary winding 23 is energized.

Assuming that silicon controlled rectifier 60 has positive anode voltage during the half cycle, it will be triggered by the firing pulse induced across the secondary winding 95 of the pulse transformer 94 when capacitor 86 is discharged by the unijunction transistor 81. When triggered, the controlled rectifier 60 functions like an ordinary diode. Thus, during the half cycle, the instantaneous current follows a path which may be traced from the low side of the A.C. supply through supply line 52, input lead 15, output lead 22, lamp 41, output lead 21, secondary winding 24, switching terminal lead 17, switching network line 53, branch line 68, controlled rectifier 60, switching network line 54, switching terminal lead 18, input lead 14 and supply line 51 connected to the high side of the power supply. In the next half cycle, controlled rectifier 61 has a positive anode voltage and is fired. The instantaneous current follows substantially the same path in a reverse direction.

It will be noted that the dimming of the fluorescent lamps 41 is achieved by firing one of the silicon controlled rectifiers 60, 61 at a predetermined point during each half cycle of the alternating current in order to control the interval of current conduction to the lamps 41. Two controlled rectifiers 60 and 61 are required since one conducts during the negative half of the cycle and the other during the positive half of the cycle. Further, if controlled rectifiers 60, 61 are fired early in each cycle, it will be seen that the "on" time of the controlled rectifier is greater than would be the case if they were fired late in the cycle. Consequently, as the firing of the controlled rectifiers 60, 61 is delayed by the phase control circuit, the lamps are progressively dimmed. The minimum brightness level occurs when the variable resistor 87 is in its maximum resistance position, since for this setting the charging rate of the capacitor 86 is such that the voltage across it does not reach the peak emitter value of the unijunction transistor 81. Therefore, the unijunction transistor is not fired during the half cycle but is only fired when the unijunction interbase voltage drops momentarily to zero during the voltage reversal which takes place at the end of each half cycle. This conduction period, which takes place near the end of the cycle, amounts to a very brief interval and does not have any appreciable effect on the luminous output of the lamps 41.

Since at the end of each half cycle the rectified voltage at base-two electrode 83 of unijunction transistor 81 drops to zero, the capacitor 86 is discharged thereby starting a new firing cycle. In this manner, the timing of the unijunction transistor pulse is always synchronized with the alternating current supply voltage. Thus, after unijunction transistor 81 has fired and discharged the capacitor 81, the voltage on capacitor 86 remains at a low value until the voltage builds up at the beginning of the next half cycle.

It will be seen that the switching network controls the instantaneous current supplied to the lamps 41 during each half cycle of the alternating current supply. In other words, the amount of energy supplied to lamp 41 is regulated by controlling the interval of current conduction in each of the ballast circuits to provide a desired degree of luminous intensity. Although in the illustrative embodiment of the invention, fifty ballasts were used to operate an equal number of lamps, it will be apparent that the number of ballasts to be operated in a dimming system depends on the current carrying capacity of the controlled rectifiers.

Variable resistor 87 of the phase control circuit is in a position of maximum brightness when it is set to provide minimum amount of resistance in series with the capacitor 86. Thus, capacitor 86 is charged to the peak emitter voltage almost instantaneously at the start of each cycle, and the entire sinusoidal input voltage is thereby supplied to all of the lamps 41 in the circuit. When variable resistor 87 is adjusted so as to increase the resistance in series with the capacitor 86, the firing angle of the controlled rectifiers 60, 61 is increased and the amount of sinusoidal input current supplied to the lamps 41 is correspondingly decreased. As the interval of current conduction to the lamps 41 is decreased, the energy emitted at the cathodes 43, 44 decreases. The fluorescent coatings of the lamps 41 receive a reduced amount of radiation with the result that the luminous intensity of the lamps 41 declines.

As the firing angle of controlled rectifiers 60, 61 is changed, it will be appreciated that the circuit changes from a steady state condition to a transient condition. Where conventional ballasts were employed with a switching network utilizing controlled rectifiers, a sharp step in light output occurred approximately in the middle of the dimming range. Although the exact nature of the transient conditions that take place are not fully understood, it was discovered that the ballast apparatus of the present invention eliminated the sharp step in light output thereby resulting in an improved performance of the dimming system. It is believed that the initial rate of current buildup in the lamp circuit at this level is so low that the conducting controlled rectifier returns to a nonconducting state with the removal of the gate pulse.

FIG. 6 illustrates a plot of percent —of light output versus percent of the setting for a dimming control in a comparable circuit in which the resistors of the present invention were not employed. It will be seen that the step in light output limits the dimming range since there is no control below the fifty percent setting. The present invention makes it possible to effectively control the dimming of fluorescent lamps down to $\frac{1}{10}$ of one percent of the light output.

The fluorescent lamp dimming system shown in FIGS. 1, 3 and 4 was constructed to operate fifty 40 watt rapid start fluorescent lamps. The following description of the circuit components is given by way of illustration and is not intended to limit the invention thereto:

| | |
|---|---|
| Primary winding 23 | 792 turns of .010 inch wire. |
| High leakage reactance secondary winding 24 | 830 turns of .0126 inch wire. |
| Secondary winding 25 | 765 turns of .010 inch wire. |
| Cathode heating windings 26, 27 | 27 turns of .010 inch wire. |
| Capacitor 16 | 3.9 microfarads, 270 volts, A.C. |
| Resistor 19 | 10,000 ohms, 1 watt. |
| Resistor 20 | 40,000 ohms, 1 watt. |
| Resistor 49 | 2 megohms, 1½ watt. |
| Silicon controlled rectifiers 60, 61 | General Electric C–35D. |
| Diodes 77, 78, 79, 80 | General Electric IN 1695. |
| Resistor 99 | 4,000 ohms, 5 watts. |
| Zener diode 98 | Motorola IM22Z, 22 volts, 1 watt. |
| Variable resistor 87 | 0–50,000 ohms, 1 watt. |
| Capacitor 86 | .25 microfarads, 50 volts, D.C. |
| Unijunction transistor 81 | General Electric 2N489. |
| Resistor 85 | 390 ohms, ½ watt. |
| Pulse transformer 94 | Sprague 31Z 382. |

The ballast apparatus shown in FIG. 5 which illustrates another exemplification of the invention, was operated with the switching network and phase control circuit described above and shown in FIGS. 3 and 4. By way of illustration the circuit components used in the ballast apparatus are described as follows:

| | |
|---|---|
| Primary winding | 840 turns of .0142 inch wire. |
| Secondary winding 103 | 1785 turns of .0113 inch wire. |
| Cathode heating windings 117, 118 | 28 turns of .0113 inch wire. |
| Reactor 105 | 1.2 henries at .4 amperes. |
| Capacitor 119 | 3.9 microfarads, 270 volts A.C. |
| Resistor 125 | 40,000 ohms, 1 watt. |
| Resistor 118 | 2 megohms, 1½ watt. |

Fluorescent lamp dimming systems having the foregoing circuit constants were operated from a 120 volt, 60 cycle supply. It will be appreciated that a number of switching networks can be used in conjunction with a single phase control circuit to operate a plurality of lamp banks. A significant advantage of the ballast circuit impedance arrangement of the invention is that it makes it possible to obtain satisfactory dimming performance. Further, the ballast circuit is readily adaptable to use in conjunction with switching networks employing silicon controlled rectifiers to control the interval of current conduction to a plurality of lamps.

To operate the ballast apparatus of FIG. 5 in the system shown in FIG. 1, input leads 107, 108 are connected across supply lines 51, 52 and the switching terminal leads are connected across the switching network lines 53, 54. The secondary winding 103 has sufficient turns to start the lamp 109 in conjunction with the starting aid circuit which includes the grounded conductive plate 120 and grounded resistor 121. When connected in the system of FIG. 1, the instantaneous current during one half cycle follows a path which may be traced from switching terminal lead 122, secondary winding 103, reactor 105, output lead 111, lamp 109, output lead 112 and to switching terminal lead 123. In the next half cycle the instantaneous current follows substantially the same path in a reverse direction. Thus, it will be seen that as the phase angle of controlled rectifiers in the switching network is varied that the interval of current conduction to lamp 109 is varied to provide a desired level of luminous intensity.

It will be understood that the system and various ballast circuits described herein are intended as illustrative examples of the invention and that the invention is not limited to such embodiments of the invention. Further, it will be apparent that many other modifications of the particular embodiments of the invention described herein may be made. It is to be understood, therefore, that I intend by the appended claims to cover all such modifications that fall within the true spirit and scope of the invention.

What I claim as new and desire to secure by Letters Patent of the United States is:

1. A system for dimming and operating a plurality of gaseous discharge lamps from an alternating current supply, said system comprising a plurality of fluorescent lamps, a plurality of ballast circuits, each of said ballast circuits having a pair of output leads connected in circuit with at least one of said plurality of lamps, each of said ballast circuits including a ballast transformer having a primary winding for connection across said alternating current supply and a high leakage reactance secondary winding, a first resistor connected in shunt across said high leakage reactance secondary winding, a pair of switching terminal leads, one of said switching terminal leads being connected in circuit with one end of the primary winding and the other of said switching terminal leads being connected in circuit with one end of said secondary winding, the other end of said secondary winding being connected in circuit with one of said output leads and the other end of said primary winding being connected in circuit with the other of said output leads, a second resistor connected across said primary winding and said high leakage reactance secondary winding, a switching network including at least a pair of electronic switches connected across said switching terminal leads so as to control the interval of current conduction between the primary and secondary winding during each half cycle of the alternating current supply; and a phase control means connected in circuit with said switching network and adapted to vary the phase angle at which said electronic switches are fired during each half cycle of the alternating current supply and thereby regulate the interval during each half cycle when said electronic switches are opened and closed to control the interval of current conduction and thereby vary the luminous intensity of said lamps.

2. A system for dimming and operating a plurality of gaseous discharge lamps from an alternating current supply, said system comprising a plurality of lamps; a plurality of ballast circuits, each of said ballast circuits comprising an autotransformer having a primary winding for connection across the alternating current supply, a high leakage reactance secondary winding inductively coupled with said primary winding, a resistor connected across said high leakage reactance secondary winding, a pair of switching terminal leads and circuit means connecting at least one of said plurality of lamps, said high leakage reactance secondary winding and said primary winding in series circuit relationship across said switching terminal leads, one of said switching terminal leads connected in circuit with one end of the primary winding and the other of said switching terminal leads connected in circuit with one end of said high leakage secondary winding; a switching network including at least a pair of controlled rectifiers connected in inverse parallel circuit relation across said switching terminal leads so as to set the interval of current conduction during each half cycle of the alternating current between said primary and secondary windings of said ballast circuits; and a phase control means connected in circuit with said switching network and adapted to vary the phase angle at which said controlled rectifiers are fired during each half cycle of the alternating current supply and thereby regulate the interval during each half cycle when said controlled rectifiers are fired to selectively control the interval of current conduction and thereby vary the luminous intensity of said lamps.

References Cited by the Examiner
UNITED STATES PATENTS

| | | | |
|---|---|---|---|
| 2,829,314 | 4/58 | Vradenburgh | 315—282 X |
| 2,869,037 | 1/59 | Brooks | 315—97 |
| 2,920,240 | 1/60 | Macklem | 315—201 |
| 2,996,656 | 8/61 | Sola | 315—282 X |

References Cited by the Applicant

General Electric Controlled Rectifier Manual (First Edition, 1960, pages 86–90).

GEORGE N. WESTBY, *Primary Examiner.*

RALPH NILSON, *Examiner.*